(12) United States Patent
Lagus

(10) Patent No.: US 10,845,273 B2
(45) Date of Patent: Nov. 24, 2020

(54) APPARATUS AND METHOD FOR SAMPLING SOLIDS IN PIPELINE FLUID

(71) Applicant: Todd Peter Lagus, The Woodlands, TX (US)

(72) Inventor: Todd Peter Lagus, The Woodlands, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 238 days.

(21) Appl. No.: 15/986,393

(22) Filed: May 22, 2018

(65) Prior Publication Data

US 2018/0356314 A1 Dec. 13, 2018

Related U.S. Application Data

(60) Provisional application No. 62/517,349, filed on Jun. 9, 2017.

(51) Int. Cl.

| | | |
|---|---|---|
| *G01N 1/20* | (2006.01) | |
| *G01F 1/74* | (2006.01) | |
| *G01F 1/36* | (2006.01) | |
| *G01N 1/10* | (2006.01) | |
| *G01N 1/40* | (2006.01) | |

(52) U.S. Cl.
CPC ............ *G01N 1/2035* (2013.01); *G01F 1/36* (2013.01); *G01F 1/74* (2013.01); *G01N 2001/1025* (2013.01); *G01N 2001/205* (2013.01); *G01N 2001/4088* (2013.01)

(58) Field of Classification Search
CPC ............ G01N 1/2035; G01F 1/36; G01F 1/74
See application file for complete search history.

(56) References Cited

U.S. PATENT DOCUMENTS

| | | | |
|---|---|---|---|
| 3,495,546 A | 2/1970 | Brown et al. | |
| 3,602,934 A * | 9/1971 | Reed | B08B 9/0553 |
| | | | 15/104.061 |
| 3,939,519 A * | 2/1976 | Muirhead | B08B 9/0557 |
| | | | 15/104.061 |
| 4,016,620 A * | 4/1977 | Powers | B08B 9/0553 |
| | | | 15/104.061 |
| 5,875,803 A | 3/1999 | Leitko et al. | |
| 6,370,721 B1 | 4/2002 | Torres, Jr. et al. | |
| 6,944,902 B1 | 9/2005 | Richter et al. | |
| 8,276,662 B2 * | 10/2012 | Niconoff | E21B 43/08 |
| | | | 137/625.29 |

(Continued)

*Primary Examiner* — Nimeshkumar D Patel
*Assistant Examiner* — Jean F Morello
(74) *Attorney, Agent, or Firm* — ExxonMobil Upstream Research Company—Law Organization

(57) ABSTRACT

Systems, methods, and apparatuses are provided for sampling solid particles in fluid flowing through a pipeline. In one or more embodiments, a pipeline pig having at least one bypass channel and at least one filter located within the bypass channel is configured to collect solid particles within the fluid of predetermined minimum size. Additional filters of varying mesh size may be included. In other embodiments, at least one valve may be used to adjust the fluid flow through the bypass channel, and a flow metering device may be configured to measure a flow rate of the fluid flowing through the bypass channel. In other embodiments, a bypass control device may be configured to control the valve to regulate fluid flow rate and fluid access into the bypass channel.

18 Claims, 2 Drawing Sheets

(56) References Cited

U.S. PATENT DOCUMENTS

| | | |
|---|---|---|
| 8,650,694 B2 | 2/2014 | Pruett et al. |
| 2011/0114119 A1* | 5/2011 | Yang .................... B08B 9/0551 134/8 |

* cited by examiner

APPARATUS AND METHOD FOR SAMPLING SOLIDS IN PIPELINE FLUID

CROSS-REFERENCE TO RELATED APPLICATION

This application claims the benefit of U.S. Provisional Patent Application 62/517,349 filed Jun. 9, 2017 entitled APPARATUS AND METHOD FOR SAMPLING SOLIDS IN PIPELINE FLUID, the entirety of which is incorporated by reference herein.

BACKGROUND

Field of Disclosure

The present disclosure relates to an apparatus and method for sampling solid particles in fluid flowing through a pipeline. In particular, the apparatus and method involve using a modified pipeline integrity gauge ("pig") with one or more filters adapted to collect solid particles of predetermined size within the fluid.

Description of Related Art

This section is intended to introduce various aspects of the art that may be associated with the present disclosure. This discussion aims to provide a framework to facilitate a better understanding of particular aspects of the present disclosure. Accordingly, it should be understood that this section should be read in this light, and not necessarily as an admission of prior art.

During offshore oil and gas extraction and production, sand and other solid particles (collectively referred to as "sand") may flow into pipelines together with the crude oil and gas. Sand production may affect the operation of oil and gas wells, and excessive accumulation in wells, pipelines and topside facilities may cause erosion, corrosion and even well shut-ins. Sand production may also indicate well formation failure. It is therefore important for operators of offshore oil and gas production facilities to accurately detect and monitor sand flowing through pipelines to minimize potential disruptions and optimize operations.

Several approaches for detecting and measuring sand production are known. For example, topside fluid sampling systems collect samples of the liquid or multiphase fluid once it reaches the topside (above sea level) facility. One drawback, however, of topside fluid sampling systems is that they provide limited accuracy when sand concentrations in the fluid flow are low (e.g., between 1 and 10 mg/L). At typical sample sizes (e.g., 100 mL samples), relatively small sand amounts can be collected, they may be lost during handling, and they may require special tools to measure accurately. Samples often must be unworkably large to accumulate a measurable amount of sand, and results may be very sensitive to orientation (e.g., top or bottom of the pipe) due to gravitational concentration gradients and the possibility that sand may accumulate in the pipeline before reaching the sampling point.

More recently, sampling systems relying on acoustic or ultrasonic sensors have been developed that can estimate sand production by detecting collisions between the sand and the pipe surface as the fluid flows through the pipeline. Sensors are typically mounted outside the pipeline for this purpose. While this type of measurement may be qualitatively useful, quantifying sand production and calculating particle size based on reflected acoustic signals often requires impractical calibration methods such as injecting sand into wellheads, is sensitive to external and internal noise, and requires regular maintenance that is not practical when sensors are placed subsea.

Accordingly, there remains a need in the industry for apparatuses, methods, and systems that provide thorough and reliable sand detection, monitoring, and sampling, as well as accurate quantification and characterization of particle sizes across various pipeline locations and structures.

SUMMARY

The present disclosure provides systems for sampling fluid flowing through a pipeline. In some embodiments, the systems may include a pipeline pig having at least one bypass channel permitting fluid therethrough and at least one filter located within the bypass channel and configured to collect solid particles within the fluid of predetermined minimum size. The systems may further include additional filters located within the bypass channel and upstream of the first filter, wherein the one or more additional filters have larger mesh size than the first filter. In other embodiments, the systems may include at least one valve configured to adjust the fluid flow through the bypass channel. In yet some other embodiments, the systems may include a flow metering device configured to measure a flow rate of the fluid flowing through the bypass channel. In additional embodiments, the systems may include a bypass control device configured to control the valve to regulate fluid flow rate and fluid access into the bypass channel.

The present disclosure also provides methods for sampling fluid flowing through a pipeline. In some embodiments, the methods may include inserting into the pipeline a pipeline pig comprising at least one bypass channel and a first filter located within the bypass channel; passing fluid from the pipeline through the bypass channel of the pipeline pig; and using the first filter to collect solid particles in the bypass channel of the pipeline pig. The methods may also include extracting the pipeline pig from the pipeline, and collecting the solid particles accumulated within the bypass channel. In some other embodiments, the methods may further include using one or more additional filters located within the bypass channel and upstream of the first filter to accumulate solid particles of minimum size larger than the minimum size of the solid particles accumulated with the first filter. In yet other embodiments, the methods may include adjusting the fluid flow through the bypass channel using at least one valve. In some other embodiments, the methods may include calculating a concentration of solids in the pipeline fluid based on at least one of mass, weight, or volume of collected solids and a total fluid flow passed through the bypass channel. The methods may optionally include calculating the total fluid flow passed through the bypass channel based on a flow rate of fluid flowing through the bypass channel. In additional embodiments, the methods may further comprise regulating fluid flow rate and fluid access into the bypass channel by using a bypass control device to control the valve.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following descrip

Figure 1:
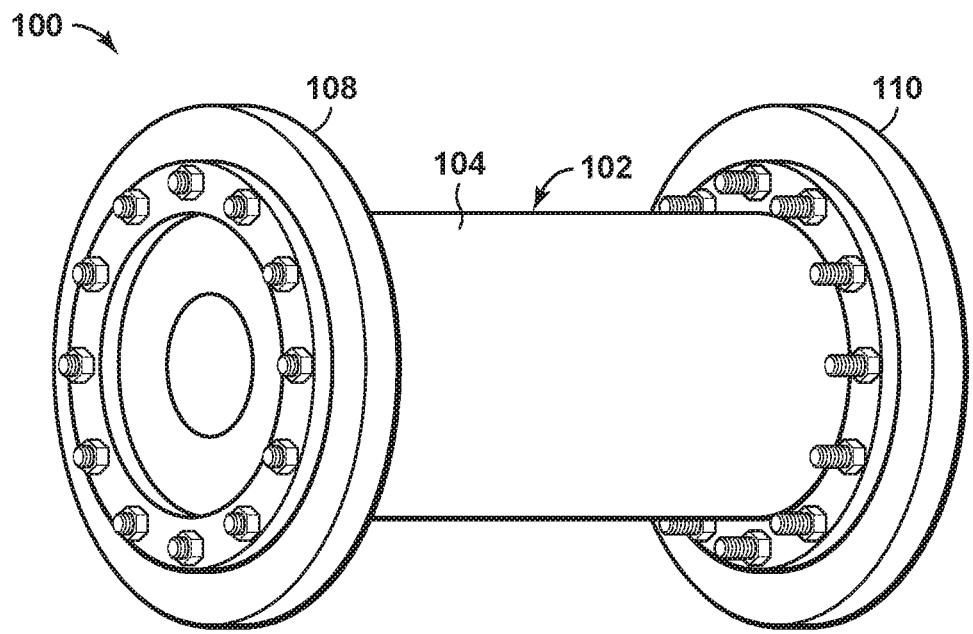
- FIG. 1 is a perspective view of an apparatus for sampling solids in pipeline fluid that may be implemented in connection with one or more aspects of the present invention.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

To promote an understanding of the principles of the disclosure, reference will now be made to the features illustrated in the drawings and specific language will be no limitation of the scope of the disclosure is thereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

A pipeline "pig" is a device that may be inserted into a pipeline to push liquids and solids from the pipeline, to scrape debris off the pipeline walls, or to inspect the condition of pipeline deposits and material defects on the pipeline walls. Pigs are generally designed to fit tightly within the interior of pipelines and are adapted to withstand the pressure, temperature, and composition of the material(s) flowing through the pipeline.

In its simplest form, a pig can be a sphere or cylinder made of a single material such as a polymer-coated foam. More complex designs use mandrels to mount modular devices, including scrapers, brushes, discs, and other elaborate geometries made of a wide range of metals and polymers. Flow of liquid hydrocarbons, water, gas (or a combination of those) produced by wells or artificial pumps may drive the pig inside the pipeline, with or without the use of compressors to further assist motion. Pigs may also have "bypass" channels that allow a portion of the driving fluid to flow through the pig body. The bypass can serve to lower the velocity of the pig below an acceptable limit through manual or automatic valves as described generally, for example, in U.S. Pat. Nos. 6,370,721; 8,650,694; 3,495,546; and 6,944,902. The bypass may also be used to provide one or more jets of flow out of the front of the pig, for example, to entrain solids or apply chemicals in the flow to the pipeline wall, as generally described, for instance, in U.S. Pat. No. 5,875,803.

As used herein, "sand" refers to all solids produced from an oil and gas well. Solids include quartz sand and other reservoir rock particles produced into the pipeline, inorganic scales formed during production, organic scales formed during production, and other solids carried from the reservoir into the production train or formed in the production train.

The articles "the," "a" and "an" are not necessarily limited to mean only one, but rather are inclusive and open ended to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"Exemplary" is used exclusively herein to mean "serving as an example, instance, or illustration." Any embodiment or aspect described herein as "exemplary" is not to be construed as preferred or advantageous over other embodiments.

Aspects described herein provide an apparatus and method for sampling fluid flowing through a pipeline using a modified pig with a filter adapted to collect sand particles of predetermined size. The apparatus and method may be preferably used to sample fluid in oil and gas pipelines, but other pipeline structures and systems are contemplated such as those involving transport or distribution of water, chemicals, food products, etc.

The present disclosure provides systems for sampling fluid flowing through a pipeline. In some embodiments, the systems may include a pipeline pig having at least one bypass channel permitting fluid therethrough and at least one filter located within the bypass channel and configured to collect solid particles within the fluid of predetermined minimum size. The systems may further include additional filters located within the bypass channel and upstream of the first filter, wherein the one or more additional filters have larger mesh size than the first filter. In other embodiments, the systems may include at least one valve configured to adjust the fluid flow through the bypass channel. In yet some other embodiments, the systems may include a flow metering device configured to measure a flow rate flowing through the bypass channel. In additional embodiments, the systems may include a bypass control device configured to control the valve to regulate fluid flow rate and fluid access into the bypass channel.

The present disclosure also provides methods for sampling fluid flowing through a pipeline. In some embodiments, the methods may include inserting into the pipeline a pipeline pig comprising at least one bypass channel and a first filter located within the bypass channel; passing fluid from the pipeline through the bypass channel of the pipeline pig; and using the first filter to collect solid particles in the bypass channel of the pipeline pig. The methods may also include extracting the pipeline pig from the pipeline, and collecting the solid particles accumulated within the bypass channel. In some other embodiments, the methods may further include using one or more additional filters located within the bypass channel and upstream of the first filter to accumulate solid particles of minimum size larger than the minimum size of the solid particles accumulated with the first filter. In yet other embodiments, the methods may include adjusting the fluid flow through the bypass channel using at least one valve. In some other embodiments, the methods may include calculating a concentration of solids in the pipeline fluid based on at least one of mass, weight, or volume of collected solids and a total fluid flow passed through the bypass channel. The methods may optionally include calculating the total fluid flow passed through the bypass channel based on a flow rate of fluid flowing through the bypass channel. In additional embodiments, the methods may further comprise regulating flow rate and fluid access into the bypass channel by using a bypass control device to control the valve.

Illustrated in FIG. 1 is an exemplary embodiment of the sampling apparatus 100 provided herein, comprising a pig 102 with an elongated pig body 104. The pig body may be made of any material suitable for insertion into a pipeline and capable of withstanding the pressure, temperature, and composition of the liquid or multiphase fluid flowing therein. The pig body may be metallic, or also polymer, composite, or other material with adequate strength and material properties to suit the application. The pig body 104 is preferably cylindrical but may be of any shape suitable to move through a pipeline. The pig 102 may include at least a pair of guide disks 108, 110, each located at respective ends of the pig body 104 and radially projecting from the body. The pig 102 may also include additional sealing disks and scrapers (not shown) located in proximity to the guide disks 108, 110 towards the interior of the pig body 104. The guide disks 108, 110 may be designed to substantially fit the inner cavity of a pipeline and provide support to the pig 102 within the pipeline. The guide disks 108, 110 may be made of a flexible material to allow close contact with the inner cavity of the pipeline.

Figure 2:
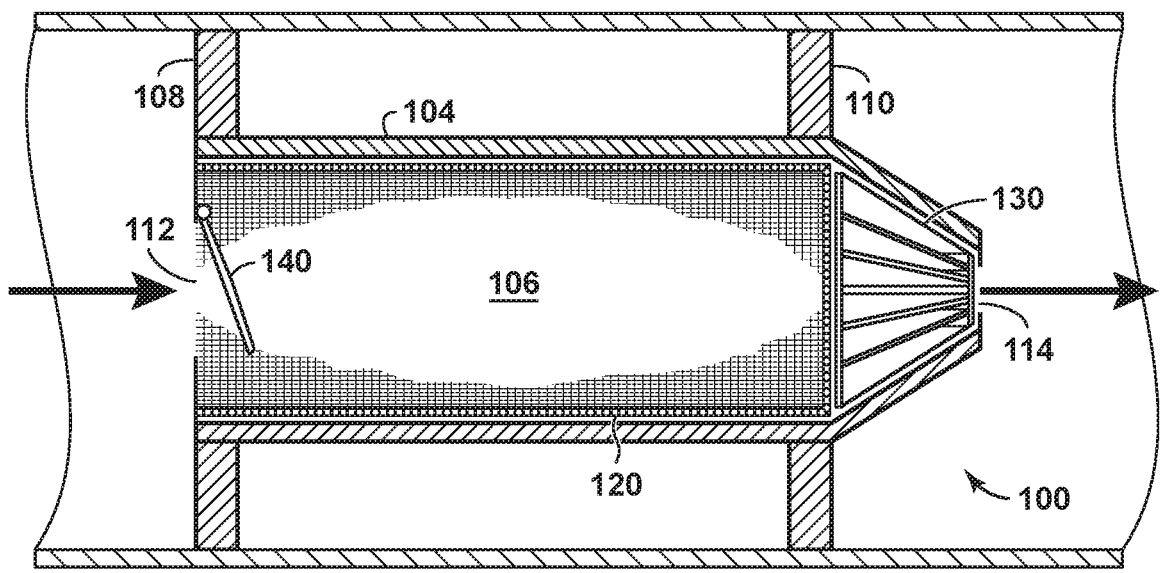
FIG. 2 is a cross-sectional view of an apparatus for sampling solids in pipeline fluid that may be implemented in connection with one or more aspects of the present invention.

Illustrated in FIG. 2 is a cross-section of the exemplary embodiment of FIG. 1 showing at least one bypass channel 106 within the pig body 104. The bypass channel 106 may be of any shape configured to permit fluid flow through the pig body 104 as the sampling apparatus 100 travels through a pipeline, and substantially in the same direction as the flow of fluid through the pipeline. Embodiments contemplated herein may alternatively comprise multiple bypass channels of different sizes and configurations.

In operation, the sampling apparatus 100 may be inserted into a pipeline and propelled by the pressure of the flow within the pipeline. Specifically, the sampling apparatus 100 may be propelled by varying the amount of pipeline fluid flowing around and/or through the pig. For example, fluid may enter the sampling apparatus through an opening 112 on the rear side, flow through the bypass channel 106, and exit the apparatus through an opening 114 on the front side. The openings 112, 114 may be of any size and shape suitable to permit fluid flow through the pig body 104. As the fluid flow traverses around the pig and/or through the bypass channel 106, pressure may build up on the rear side, causing the sampling apparatus 100 to move through the pipeline in the direction of the fluid flow.

In accordance with an embodiment of the invention, the sampling apparatus 100 further includes at least one filter 120. The filter 120 may be located anywhere within the path of all or some of the fluid flow passing through the pig body 104 and preferably within the bypass channel 106. The filter 120 may be constructed of any material suitable to withstand the pressure, temperature, and composition of the fluid flowing within a pipeline. The material of the filter also provides a permeable surface allowing a substantial part of the flow to pass through the filter 120. The filter 120 may be made of one or more metals, one or more polymers (such as Polytetrafluoroethylene), one or more composites, one or more organic or inorganic fibers, or any combination thereof. The filter 120 may be configured to prevent solid particles within the fluid larger than a predetermined size (i.e., the filter's "mesh size") from passing through the filter 120, thereby accumulating such particles within the bypass channel 106 or rear side of the sampling apparatus 100 as it moves through the pipeline. Typical mesh sizes of interest in oil and gas applications vary from 1 μm to several millimeters, and preferably, between 30 μm and 1,000 μm, or between 30 μm and 500 μm. The filter 120 may be of any shape suitable to accumulate and contain a desired amount of solid particles. For example, the filter 120 may have a flat surface or concave surface (e.g. basket shape) as shown in FIG. 2.

In some embodiments, the sampling apparatus may further include at least one valve 130. The valve 130 may be located at the rear side (flow entry) or front side (flow exit) of the sampling apparatus 100, and may be in fluid communication with the bypass channel 106. The valve 130 may be of any type suitable to allow control of the flow through the bypass channel 106 to maintain a predetermined speed of the sampling apparatus 100 within the pipeline and/or clear the path of the sampling apparatus 100 should debris or buildup be encountered within the pipeline. For example, rotating plates that block flowpaths in valves rely on adjusting the valve manually before launching into the pipeline while other automatic valves rely on venturi passages, controllers, and other pressure-induced mechanisms for opening and closing the valve while in the pipeline. Preferably, the maximum speed of the sampling apparatus may range between 1.5 and 10 feet per second (ft/s). Bypass may be expressed in terms of a percent of the pipeline volumetric flow rate; e.g. for "5% bypass" on a 100 barrel per day flow through the pipeline, a 5 barrel per day flow rate will pass through the pig. Some embodiments according to the disclosure herein may be configured to exhibit a bypass between 5% and 15%, although any bypass amount is possible.

In some embodiments, the sampling apparatus 100 may further include a check valve 140 or similar device that allows fluid flow in only one direction. The check valve 140 may be positioned on the rear side (flow entry) of the sampling apparatus or at an inlet of the bypass channel 106 in order to prevent solid particles collected by the filter 120 from escaping the bypass channel 106. A swing check valve, ball check valve, diaphragm check valve or other type of valve may be used. Preferably, a spring or springs will provide closing force for the check valves to prevent any back leakage through the valve.

Figure 3:
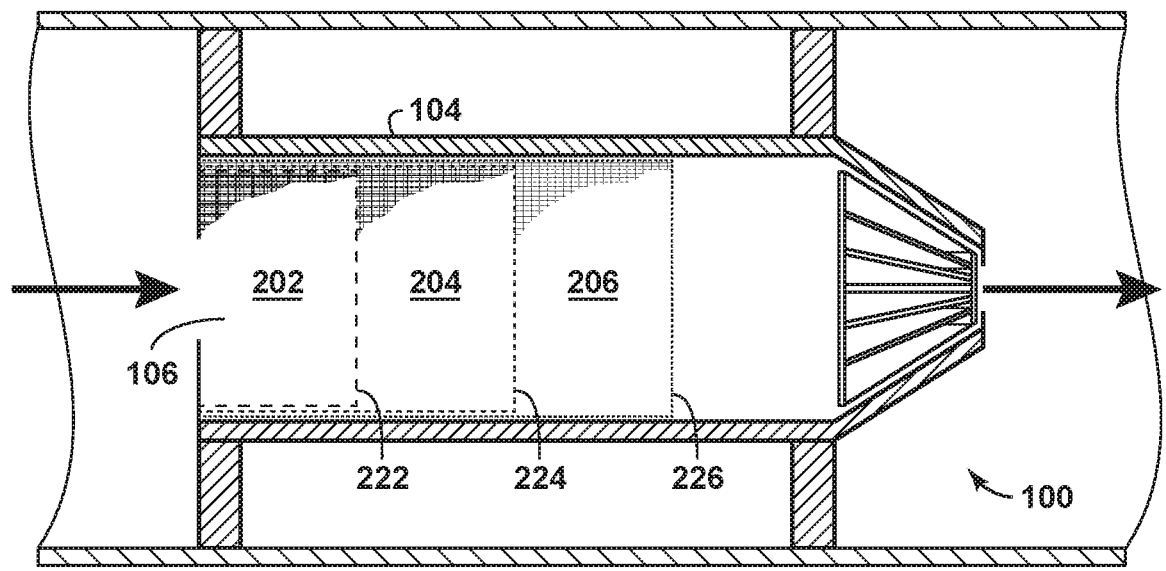
FIG. 3 is a cross-sectional view of an apparatus for sampling solids in pipeline fluid comprising multiple filters which may be implemented in connection with one or more aspects of the present invention.

FIG. 3 illustrates an exemplary embodiment of the sampling apparatus 100 comprising multiple filters 222, 224, 226 located within the bypass channel 106 of the pig body 104. The filters 222, 224, 226 may be of different mesh size to capture solid particles of varying size within intermediate cavities 202, 204, 206 within the bypass channel 106. Filters of decreasing mesh size may be serially positioned along the bypass channel 106 to sequentially capture particles of different minimum size. One benefit of this approach is the ability to obtain a "snapshot" of the particle size distribution within the fluid at a given time. Although the exemplary embodiment illustrated herein shows three filters, it should be understood that the present disclosure encompasses sampling apparatuses 100 with two, three, four, or more filters of equal or varying mesh size.

Figure 4:
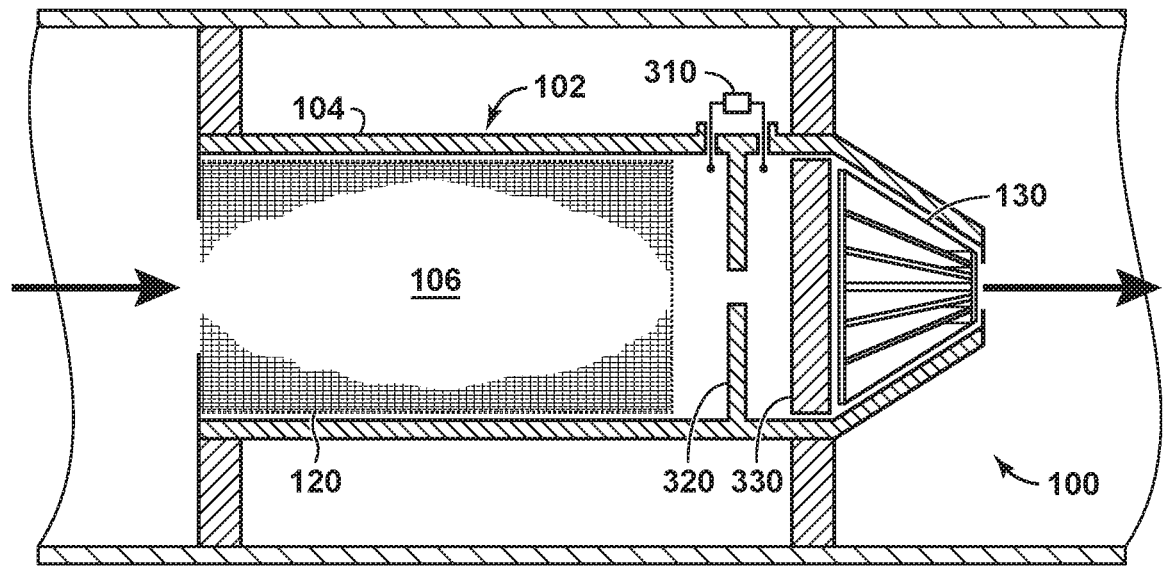
FIG. 4 is a cross-sectional view of an apparatus for sampling solids in pipeline fluid comprising a flow metering device which may be implemented in connection with one or more aspects of the present invention.

FIG. 4 is a cross-section of an exemplary embodiment of the sampling apparatus 100 comprising a flow metering device 310 located along the flowpath of the bypass channel. Suitable examples of flow metering devices include differential pressure flow meters, orifice flow meters, venturi flow meters, turbine flow meters and other devices capable of performing direct flow measurements. In some embodiments, the flow metering device 310 may be configured to measure the flow rate through the bypass channel 106 as the sampling apparatus 100 travels through a pipeline. For example, as shown in FIG. 4, the flow metering device 310 may be configured to measure a differential pressure across an orifice plate 320 positioned between the front end of the filter 120 and the valve 130.

In yet other embodiments, the sampling apparatus 100 may further include a bypass control device 330 configured to control the valve 130 to regulate fluid flow within the bypass channel 106 or regulate fluid access by partially or entirely opening or closing fluid access. The bypass control device 330 may be located anywhere on the sampling apparatus 100, preferably on the front of the pig 102. For example, FIG. 4 illustrates an embodiment where the bypass control device 330 is located between the orifice plate 320 and the valve 130. The bypass control device 330 may be actuated and automated via any suitable mechanism, including manual adjustments, sensor-based, timer-based, or remote. In embodiments comprising a valve 130, for example, the bypass control device 330 may control the valve 130 to entirely close the bypass channel 106 at certain locations within the pipeline or during certain time periods. By controlling access to the bypass channel 106 at some locations of the pipeline while the sampling apparatus 100 travels through the pipeline, sampling may be localized, i.e., samples may be collected from specific areas of interest.

A method for sampling pipeline fluids according to one or more aspects of the present disclosure will now be described. The method preferably involves launching into an active pipeline a sampling apparatus 100 comprising a modified pig 102 including at least one filter 120 according to the present disclosure. In some embodiments, one or more additional filters of various configurations and mesh sizes can be included to collect solid particles of different minimum size. Although conventional pig launchers and receivers may be used to launch and receive, respectively, a modified pig 102 according to the present disclosure, other techniques known in the industry for launching and receiving pigs without launchers or receivers may be employed. Additionally, unconventional subsea pig launchers and receivers may also be used.

A valve 130 in fluid communication with the bypass channel 106 may be adjusted prior to launch or configured to be adjusted remotely or automatically as the sampling apparatus 100 travels through a pipeline in order to regulate fluid flow through the bypass channel 106 and maintain a specified speed within the pipeline or adjust the speed of the sampling apparatus 100 to a desired speed. For example, radial plates in the valve 130 may be rotated to either open or close flowpaths through aligning holes on a stator plate. By creating a larger open flow area, a larger bypass flow may be obtained.

After the sampling apparatus 100 is launched into the pipeline, solid particles of sizes larger than the mesh size(s) of the filter(s) may begin accumulating within the bypass channel 106 as the apparatus travels through the pipeline. In some embodiments, the sampling apparatus 100 can travel distances between hundreds of meters and hundreds of kilometers. For example, for a facility producing 100 thousand barrels per day (kbd), a 12 hour run of the sampling apparatus with a 5% flow bypass by volume will result in about 2,500 barrels of fluid going through the bypass channel. At a sand concentration of 10 mg/L, nearly 9 pounds (lbs) (roughly equal to 4.1 kg) of solid particles may be collected.

In some embodiments, after receiving the sampling apparatus 100 at a pig receiver located on another platform or onshore facility, the solids accumulated within the bypass channel 106 and/or filter(s) 120/222, 224, 226 may be extracted and collected. For example, suitable opening(s) along the pig body 104 (not shown) may allow either direct emptying of the contents collected in one or more cavities of the bypass channel 106, or flushing of the contents with water or another type of liquid substance. Alternatively, an opening of sufficient size to allow removal of concave filter(s) may permit retrieval of the filter(s) together with any collected sand.

As an example, to calculate the concentration of total solids or the concentration of a particular size of solids on a fluid volume or mass basis, the mass of solids may be divided by the mass or volume of flow through the sampling apparatus 100. The flow through the bypass channel 106 can be determined using an assumed total bypass percentage, data such as expected travel time, actual travel time, pipeline flow rate, pressure, and temperature, or by direct flow rate measurement through the bypass channel 106 using a flow metering device 310. As an example, if 10 kg of solids are collected for a cumulative liquid flow rate of 1,000,000 L (6,300 barrels), the total solids concentration is 10 kg/1,000,000 L=10 mg/L (3.5 lb/kbbl).

In some embodiments, sampling may be performed in specific locations within a pipeline. For example, after launching the sampling apparatus 100, a bypass control device 330 may adjust the valve 130 to open or close fluid access into the bypass channel 106 at predetermined or specified locations within the pipeline remotely, by a timer, or by one or more sensors, to collect sand samples from desired points of interest along the pipeline.

Accordingly, the present disclosure presents numerous advantages over the prior art systems and methods for sampling pipeline fluids. Unlike prior systems, the use of an improved pig allows unparalleled internal access to the pipeline fluids and solids along significant distances. In contrast to current methods for which only sampling of small volumes of fluid (topside) is feasible, systems and methods according to the present disclosure permit sampling of large volumes of liquid in an effective manner by relying on one or more filters located within a bypass channel of the improved pig device, without the need to remove liquid from the pipeline. Thus, fewer disposal or fluid handling risks are encountered, and more representative samples are obtained.

Disclosed aspects may include any combinations of the methods and systems shown in the following numbered paragraphs. This is not to be considered a complete listing of all possible aspects, as any number of variations can be envisioned from the description above.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. An apparatus for sampling solid particles in a fluid flowing through a pipeline comprising:
   a pipeline pig having at least one bypass channel permitting fluid flow therethrough;
   a first filter located within the bypass channel and configured to collect solid particles of predetermined minimum size; and
   at least one valve configured to adjust the fluid flow through the bypass channel.

2. The apparatus of claim 1, wherein the valve is located near an outlet of the bypass channel.

3. The apparatus of claim 1, further comprising a bypass control device configured to control the at least one valve to regulate fluid flow through the bypass channel.

4. The apparatus of claim 1, wherein the first filter has an average mesh size of at least 30 µm.

5. The apparatus of claim 1, further comprising one or more additional filters located within the bypass channel and upstream of the first filter.

6. The apparatus of claim 5, wherein the one or more additional filters have larger mesh size than the first filter.

7. The apparatus of claim 1, wherein the first filter is made of at least one of a metal, a polymer, a composite, an organic fiber, or an inorganic fiber.

8. The apparatus of claim 1, further comprising a flow metering device configured to measure a flow rate of fluid flowing through the bypass channel.

9. The apparatus of claim 8 wherein the flow metering device comprises a differential pressure measurement device, an orifice flow meter, a venturi flow meter, or a turbine flow meter.

10. A method of sampling solid particles in a fluid flowing through a pipeline comprising:
    inserting into the pipeline a pipeline pig comprising at least one bypass channel and a first filter located within the bypass channel;
    passing a portion of the fluid from the pipeline through the bypass channel of the pipeline pig;
    adjusting the fluid flow through the bypass channel using at least one valve that is located in the bypass channel of the pipeline pig; and
    using the first filter to accumulate a sample of the solid particles of a predetermined minimum size within the bypass channel of the pipeline pig.

11. The method of claim 10 further comprising:
    extracting the pipeline pig from the pipeline; and
    collecting the solid particles accumulated within the bypass channel.

12. The method of claim 10, further including adjusting the fluid flow through the bypass channel using the valve to achieve a speed reduction of the pipeline pig between 5 and 15% of the speed of the flow of the fluid in the pipeline.

13. The method of claim 10, further comprising:
    controlling the valve using a bypass control device to regulate fluid flow through the bypass channel.

14. The method of claim 10, further comprising:
    using one or more additional filters located within the bypass channel and upstream of the first filter to accumulate solid particles of a minimum size that is larger than the minimum size of the solid particles accumulated using the first filter.

15. The method of claim 11, further comprising:
    calculating a concentration of solids in the pipeline fluid based on at least one of mass, weight, or volume of collected solids and a total fluid flow passed through the bypass channel.

16. The method of claim 15, further comprising:
    calculating the total fluid flow passed through the bypass channel based on a flow rate of fluid flowing through the bypass channel.

17. The method of claim 16, wherein the flow rate of fluid flowing through the bypass channel is measured directly using at least one of differential pressure measurement, orifice flow meter, venture flow meter, or turbine flow meter.

18. The method of claim 11, further comprising:
    regulating access of fluid into the bypass channel using a bypass control device.

* * * * *